UNITED STATES PATENT OFFICE.

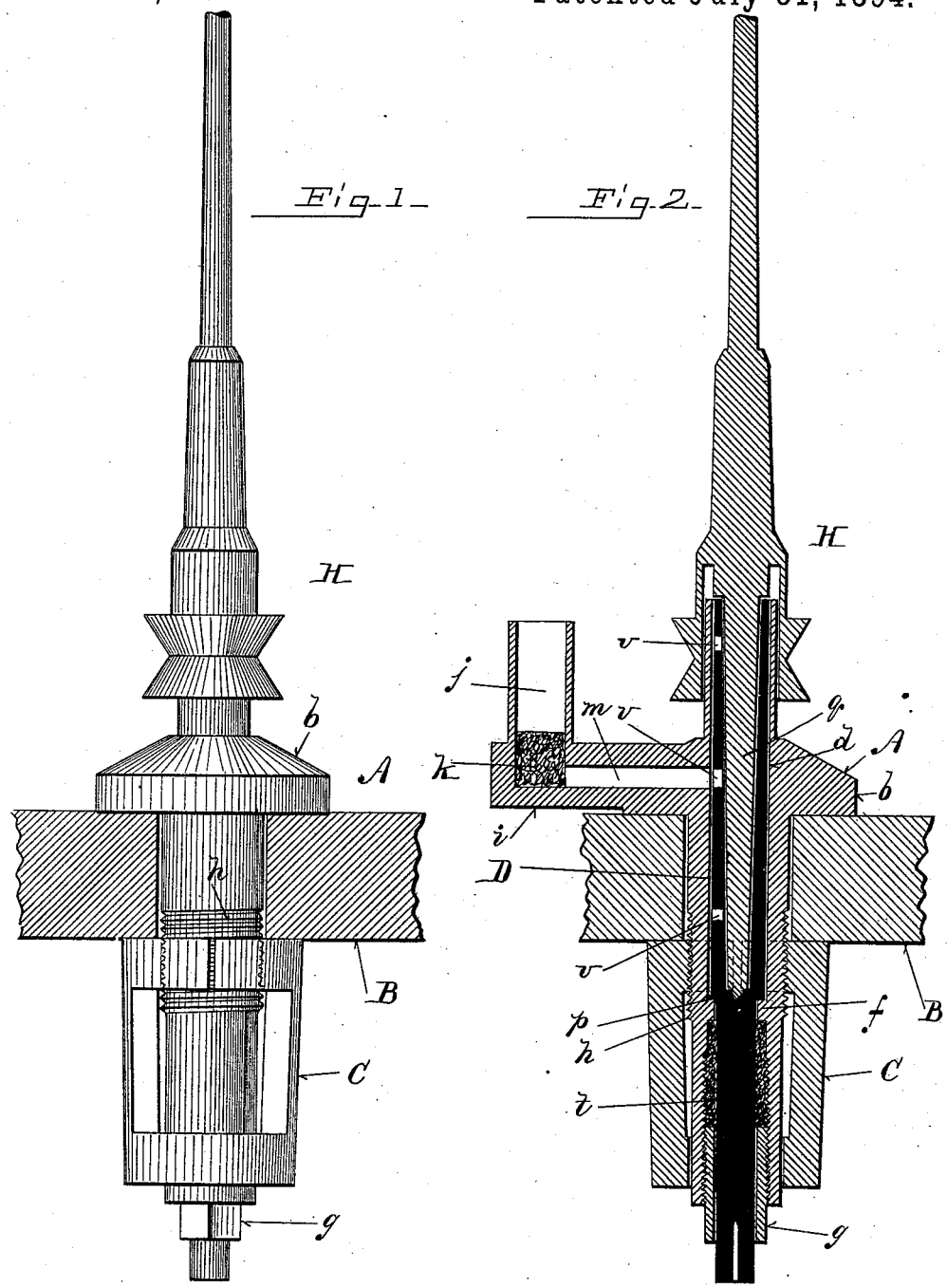

EDGAR J. CARROLL, OF WORCESTER, MASSACHUSETTS, ASSIGNOR TO WILLIAM T. CARROLL, OF SAME PLACE.

SPINDLE-BEARING.

SPECIFICATION forming part of Letters Patent No. 523,849, dated July 31, 1894.

Application filed September 22, 1893. Serial No. 486,165. (No model.)

*To all whom it may concern:*

Be it known that I, EDGAR J. CARROLL, a citizen of the United States, residing at Worcester, in the county of Worcester and State of Massachusetts, have invented certain new and useful Improvements in Spindle-Bearings; and I do hereby declare that the following is a full, clear, and exact description thereof, which, in connection with the drawings making a part of this specification, will enable others skilled in the art to which my invention belongs to make and use the same.

My invention relates to spindle bearings, and the object of my invention is to improve upon the construction of spindle bearings as now ordinarily made, and more particularly to provide a spindle bearing in which the supporting case or support is open throughout its length, and a bolster or bushing is mounted loosely in said support, having a solid lower end or tail piece extending within and below the lower end of said support, and held therein in a yielding manner, by packing contained within the support, and surrounding the tail piece of the bolster, at a point near or below the lower end of the spindle; said packing compressed within the support, and against the bolster, to hold it in place, and prevent it from turning, and to cushion the bolster, and also to prevent the escape of oil, by a nut screwed into the lower end of the support, all as will be hereinafter fully described.

Referring to the drawings: Figure 1 is a side elevation of a spindle, and spindle bearing, embodying my improvements, attached to the rail, which is shown in section, and Fig. 2 is a central vertical section, looking in the direction of arrow $a$, Fig. 1.

In the accompanying drawings, A is the supporting case, or support, having the flanged portion $b$ resting on the rail B. The support A has a central vertical opening $d$ extending through the same, and an external screw thread $h$ thereon, below the rail B, upon which thread may be screwed an ordinary nut, against the lower surface of the rail B, to secure the spindle support therein in the usual way. Instead of an ordinary nut, a spring nut or clamping device C, as shown in the drawings, may be used, which may be turned on or off the thread $h$ by hand.

The spring nut C consists of two circular portions or disks, $c$, $c'$, connected by two oppositely arranged arms $c''$. The upper circular portion or disk $c$, has a central opening therein, of uniform diameter, and provided with a screw thread, adapted to engage the screw thread $h$ on the support A; said disk portion $c$ is cut or split centrally, as shown at $o$, Fig. 1. The diameter of the screw threaded opening in the disk $c$ is a little less than the diameter of the screw threaded portion $h$ of the support A. The lower circular portion or disk $c'$ is provided with a central opening $c^3$, through which extends loosely the lower end of the support A when the spring nut C is screwed into place. By means of the split in the disk $c$, forming two parts of said disk, the arms $c''$ will act as spring arms to bind the disk $c$ on the thread $h$, so that the same will not be turned off of said thread by the jar of the spindle.

Though I have shown in the drawings a spring nut C, instead of an ordinary nut, for securing the supporting case to the rail, I do not claim said spring nut in this application as the same is claimed in my pending application, Serial No. 486,841, filed September 30, 1893.

Within the central vertical opening $d$ in the support A, extends loosely the bolster or bushing D. The bolster or bushing D is of reduced external diameter in its lower part, and has a central vertical opening $n$ therein, extending to a point below the rail B, and in said opening the spindle H is supported, and the step end thereof has its bearing in the lower end of said opening $n$.

Contained within the lower end of the support A, and surrounding the tail or lower end of the bolster D, is packing $t$, which is located entirely within said support at or below the lower end of the spindle, and bears at its upper portion against an internal projection or shoulder $f$, extending within the support A.

A hollow nut $g$, provided with an external screw thread to engage an internal screw thread in the open end of the support A, and with a squared lower end $g'$, is screwed into the lower open end of the support A, and is adapted to compress the packing $t$, which is contained within the central opening in the support A, so that the walls of said support act to prevent any lateral expansion of said packing, which is forced against the shoulder $f$, and against the lower part, or tail of the bolster D, to prevent said bolster from turning, and hold it in a yielding manner, at a point near or below the lower end of the spindle, to overcome the vibrations of the spindle. At the same time the compression of the packing $t$ by the nut $g$, makes it oil tight, so as to prevent the escape of any oil which is contained within the central opening $d$ around the bolster D, through the lower end of the support A.

The support A is provided with the oil reservoir $i$, having the vertical opening $j$, and the horizontal opening $m$ leading into the opening $d$ in the support A, through which opening $m$ the oil passes into the opening $d$, and from said opening $d$ through the series of openings $v$ in the bolster D, to the spindle H to lubricate the lower end $q$ thereof. Packing $k$ may be inserted in the reservoir $i$, as shown in Fig. 2.

The advantages of my improvements in spindle bearings will be readily appreciated by those skilled in the art.

I provide a spindle bearing in which the supporting case has an oil reservoir, with an oil duct leading to the central vertical opening in said case, in which opening the bolster, having a solid lower end or tail, is loosely mounted, and extends from the top of said case, through and below the lower end thereof, and is provided with openings leading into the central opening therein, through which openings the oil passes from the central opening in the case into the central opening in the bolster, to lubricate the spindle in said bolster. The bolster is free at its upper end, so as to have a slight lateral motion, while at its lower end it is surrounded by packing contained within the supporting case, to cushion the vibrations of the spindle, which packing, when compressed around the bolster, and against a shoulder within the supporting case, by a packing compressing nut screwed into the lower end of the supporting case, is made oil tight, so as to prevent the escape of any oil from around the outside of the bolster, through the lower end of the supporting case, and the compressed packing also prevents the bolster from turning.

It will be understood that the details of construction of some of the parts of my spindle bearing may be varied if desired.

Having thus described my invention, what I claim as new, and desire to secure by Letters Patent, is—

1. The combination with the supporting case, provided with a central opening throughout its length, and an oil reservoir, an opening leading therefrom into said central opening, having an internal projection or shoulder near its lower end, and a bolster mounted in said supporting case, and having a tail of reduced external diameter extending through the lower end thereof, of packing surrounding said tail, and contained within the central opening in the supporting case, and bearing at its upper end against said internal projection or shoulder, and a nut to compress said packing, to render the same oil tight, and prevent the bolster from turning, screwed into the lower open end of said supporting case, substantially as shown and described.

2. In a spindle bearing, the combination with the supporting case, having a central vertical opening throughout its length, and an oil reservoir, an opening leading therefrom into said central opening, and an internal projection or shoulder within the lower part of said central opening, of a bolster or bushing, mounted in said supporting case, and provided with openings therein, through which the oil passes, from the central opening in the supporting case, and packing surrounding the lower end of the bolster, and contained within the supporting case, and a nut screwed into the lower end of the supporting case, to compress said packing against the bolster, and against the shoulder within the case, to prevent the bolster from turning, and to make the packing oil tight, substantially as set forth.

EDGAR J. CARROLL.

Witnesses:
C. F. STEVENS,
MARVIN F. AMES.